United States Patent Office 3,328,266
Patented June 27, 1967

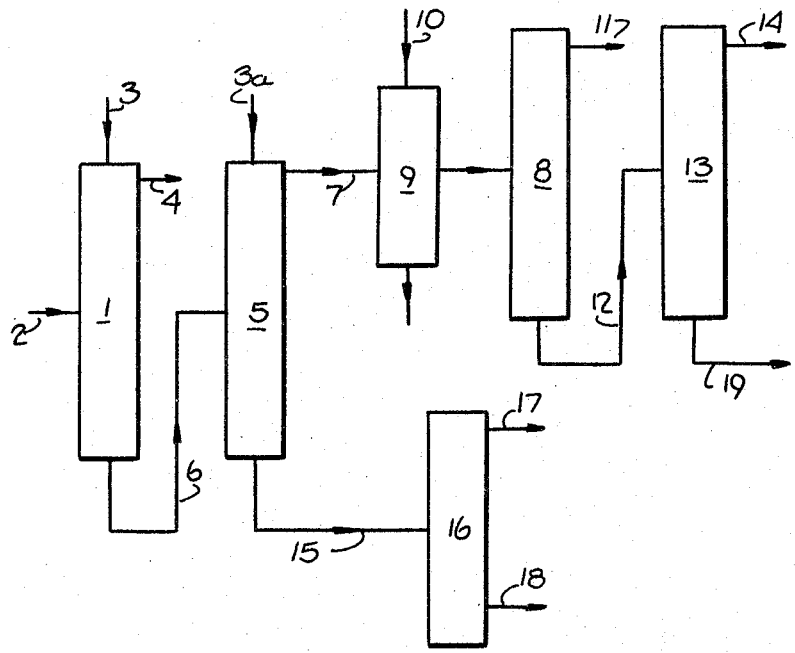

3,328,266
SEPARATION OF ACRYLONITRILE BY EXTRACTIVE DISTILLATION WITH WATER
Jacques Modiano and Francis Weiss, Pierre-Benite, Rhone, France, assignors to Societe d'Electro-Chimie, d'Electro-Metallurgie et des Acieries Electriques d'Ugine, Paris, France, a corporation of France
Filed July 9, 1963, Ser. No. 293,778
Claims priority, application France, July 11, 1962, 903,674
4 Claims. (Cl. 203—34)

The present invention relates to a process for the separation of the components of a gaseous mixture resulting from the catalytic oxidation of propylene in the presence of ammonia for the production of acrylonitrile.

The vapor phase catalytic oxidation of propylene in the presence of ammonia to produce acrylonitrile is well known. Many methods of carrying out this reaction are known which differ one from the other by such features as the composition of the gaseous feed, the reaction temperature, the contact time, and the nature of the catalyst. These various methods all produce gaseous mixtures which contain generally besides acrylonitrile a certain number of compounds resulting from secondary reactions such as acetonitrile, acrolein, hydrogen cyanide, carbon dioxide and carbon monoxide and accompanying these an excess of the reactants e.g. propylene, ammonia, air and possibly steam. It is necessary to separate these various components from the gaseous mixture and to isolate the desired products and to recycle some of the residue and in particular the ammonia. The method usually employed for this purpose consists in washing the gases leaving the reactor with a solution of sulfuric acid which eliminates the ammonia, absorbing the organic products in water and then by series of distillations, some of which may be extractive, separating the acrylonitrile from the other products. By this method ammonia is recovered in the state of ammonium sulphate which is of little commercial value, although it could be treated, in order to liberate the ammonia which could then be recycled to the reaction. In view however of the high consumption of sulfuric acid by this method the process is economically unattractive.

The invention is based essentially on the unexpected finding that it is possible to separate by extractive distillation, using water as the extractant, acrylonitrile and hydrocyanic acid on the one side and ammonia, acetonitrile and acrolein on the other. This fact has hitherto not been appreciated and could not be anticipated from a knowledge of the vapor pressures of each of these products, whether in the absence or presence of water. The extractive distillation by water has the effect of maintaining at the bottom of the column the more volatile component, i.e. ammonia, together with acetonitrile and acrolein, whereas the much less volatile acrylonitrile escapes at the top, at the same time as the hydrocyanic acid. It is probable that this phenomenon is partly the result of a modification of the volatilities of each of the components brought about by their multiplicity, since distillations carried out using mixtures of only some of the components were not always followed by similarly satisfactory separations. The separation of the five components effected in this manner facilitates considerably the later treatment and subsequently the separation of pure acrylonitrile, hydrocyanic acid and acetonitrile.

Accordingly the present invention is a process for the separation and recovery of the components of the gaseous mixture resulting from the vapor phase catalytic oxidation of propylene in the presence of ammonia to produce acrylonitrile and containing in addition to acrylonitrile, hydrogen cyanide, acetonitrile, acrolein, ammonia and carbon dioxide which comprises washing the gases with water to remove the desired components and to produce a solution containing less than about 6.5% by weight of acrylonitrile, and subjecting this solution to an extractive distillation carried out at a temperature at the bottom of the column ranging from about 40 to 70° C. using water as an extractant to separate substantially all of the acrylonitrile and the hydrogen cyanide as an overhead distillate and substantially all of the acetonitrile, acrolein, and ammonia and a major part of the carbon dioxide as base products.

Studies of the extractive distillation with water extending over binary, ternary, etc. mixtures of the various products to be separated from the reaction gases have shown in fact, and in an unexpected manner, that it is possible to obtain at the bottom of the column nearly the whole of the chemical compounds accompanying acrylonitrile. The latter accompanied by the greater part of the hydrocyanic acid is separated at the head of the extractive distillation column. Under these conditions no polymerization of the hydrocyanic acid is observed.

The process of the present invention is described in more detail with reference to the accompanying drawing which illustrates schematically in the form of a flow sheet a method for the separation and recovery of the components of a gaseous mixture in accordance with the present invention.

Referring to the drawing a gaseous mixture resulting from the vapor phase catalytic oxidation of propylene in the presence of ammonia is fed to column 1 through line 2. The column is fed with water through line 3. The operating conditions are controlled in such a way that the aqueous solution obtained at the bottom of the column contains the acrylonitrile in amounts up to about 6.5% by weight of the solution. This aqueous solution contains all the acrylonitrile, the acetonitrile, the hydrocyanic acid and the acrolein produced during the reaction as well as the non-consumed ammonia and a large portion of the carbon dioxide formed, which is held in solution owing to the presence of ammonia. The pH of the solution is generally between 9 and 9.5 while without the presence of the carbon dioxide it would be between 11 and 11.5. Under these conditions the solution obtained is so stable that even after storage for several days at ambient temperature no polymerization of hydrocyanic acid is observed. The gases which are not condensed under operating conditions of the column such as CO, $O_2$, $N_2$ and the remaining carbon dioxide are evacuated through line 4.

The separation of acrylonitrile and hydrogen cyanide from the remaining components of the mixture in the second stage of the process namely extractive distillation with water is carried out on the basis of the substantial difference in the solubility in water of the various products. The separation of the hydrogen cyanide from the ammonia is more difficult than the separation of the acrylonitrile from the ammonia but is favored by the presence of carbon dioxide which transforms the ammonia into carbonate and bicarbonate.

The separation of the components of the aqueous solution, is carried out by means of water at 3a in an extractive distillation column 5 which is fed at 6 by the aqueous solution coming from column 1.

The following products are obtained:

A head fraction, containing at least 97% of the initial acrylonitrile and approximately 95% of the initial hydrocyanic acid besides traces of acetonitrile, acrolein, ammonia and small quantities of carbon dioxide; a bottom fraction containing nearly the whole of the acetonitrile, the acrolein and the ammonia and besides carbon dioxide traces of acrylonitrile and small quantities of hydrocyanic acid (less than 5% of the quantity present).

The two fractions resulting from the extractive distillation in column 5 may if desired be passed for further separation and recovery of the individual components by any known conventional methods the separated components and in particular the unconsumed ammonia thereafter if desired being recycled to the catalytic oxidation reaction. For example as shown in the accompanying drawing the head fraction drawn off through line 7 is taken to the column 8 which permits separation of the acrylonitrile and hydrocyanic acid. Between columns 5 and 8 a small column 9 may be interposed which is sprayed at 10 with sulfuric acid and which has the object of fixing the small quantities of ammonia present in the gases. The hydrocyanic acid is removed through line 11 while the crude acrylontrile is admitted through line 12 to the purification column 13 from where pure acrylonitrile is drawn through line 14. The bottom fraction from column 5 is passed through line 15 to column 16 where at the top of the column nearly the whole of the ammonia non-consumed in the catalytic reaction, accompanied by small quantities of carbon dioxide, hydrocyanic acid and acrolein are removed thorugh line 17 and may be recycled to the reactor (not shown).

At the bottom of column 16 an aqueous solution of acetonitrile is drawn off through line 18. This solution may be treated to recover the acetonitrile from it by conventional methods.

The process of the present invention is illustrated further with reference to the following examples:

*Example 1*

The gases deriving from the oxidation by air of propylene in the presence of ammonia had a composition by volume

|  | Percent |
|---|---|
| Acrylonitrile | 2.6–3.4 |
| Acetonitrile | 0.12–0.18 |
| Acrolein | 0.03–0.07 |
| HCN | 0.6–0.9 |
| $NH_3$ | 1.2–2.2 |
| Steam | 33–38 |
| $CO_2$, CO, propylene, oxygen, nitrogen etc. | 54–59 |

After condensation and scrubbing in column 1 during the first stage of the process there was obtained at the bottom of the column an aqueous solution containing in gram-molecules per litre:

| Acrylonitrile | 0.7 |
|---|---|
| Acetonitrile | 0.04 |
| Acrolein | 0.02 |
| HCN | 0.21 |
| $NH_3$ | 0.43 |
| $CO_2$ | 0.23 |

In the second stage of the process this solution was fed continuously through 6 to an extractive column 5 of 15 theoretical plates which has the following operating conditions:

| Pressure | 100 mm. Hg. |
|---|---|
| Water flow | 8 kg./kg. acrylonitrile; this water contains hydroquinone at an average of 0.01%. |
| Temperature at column head | 25° C. |
| Temperature at column bottom | 52° C. |

Once the column was in operation the following cuts are drawn off:

At the top through 7 an organic phase (I) containing:

| Acrylonitrile | percent | 84 |
|---|---|---|
| HCN | do | 12.5 |
| $NH_3$ | ppm | <500 |
| Acetonitrile | ppm | <200 |
| Acrolein | ppm | <200 |
| Water | percent | ~3 |

At the bottom, an aqueous phase (II) containing:

|  | Percent by weight |
|---|---|
| $NH_3$ | 0.55 |
| $CO_2$ | 0.38 |
| Acetonitrile | 0.118 |
| Acrylonitrile | 0.085 |
| Acrolein | 0.070 |
| HCN | 0.022 |
| Water | 98.7 |

In a third stage the separation of the constituents of the above organic phase (I) was carried out. The gases were first passed through a small column 9 where a spray of 6% sulfuric acid stripped traces of ammonia present. The gases were then introduced into distillation column 8 operating at atmospheric pressure. The hydrocyanic acid containing a little water and of a purity of 97% is drawn off at 11.

The crude acrylonitrile drawn off at 12 had the following composition:

| Acrylonitrile | percent | 97 |
|---|---|---|
| HCN | ppm | [1]<100 |
| Acrolein | ppm | [1]<250 |
| Acetonitrile | ppm | <250 |
| Water | percent | ~3 |

[1] Mostly combined in form of cyanohydrin.

The product was then distilled in column 13 where the decomposition of the cyanohydrin is prevented through stabilization at a pH of less than 6. Pure polymerizable acrylonitrile is obtained through 14.

At the bottom of the column, at 19, a mixture of acetonitrile and acrolein cyanohydrin accompanied by small quantities of acrylonitrile is drawn off which is recycled to the catalytic reactor.

The aqueous phase (II) mentioned above was treated in the distillation column 16 at atmospheric pressure. An aqueous phase is obtained through 17 containing:

|  | Percent |
|---|---|
| $NH_3$ | 4–8 |
| Acetonitrile | 0.1–0.3 |
| Acrylonitrile | 0.4–0.8 |
| Acrolein | 0.3–0.5 |
| HCN | 0.15–0.3 |
| $CO_2$ | 2–4 |

At the bottom of this column a liquid is obtained containing essentially acetonitrile and water, from which acetonitrile can be separated.

*Example 2*

The process of separation was applied to a gaseous mixture of initial composition similar to that treated in Example 1 above in the same equipment as that which has been described with reference to the accompanying drawing.

After condensation and scrubbing in column 1 an aqueous solution is obtained at the base with the following composition in gram-molecules per litre:

| Acrylonitrile | 0.95 |
|---|---|
| Acetonitrile | 0.02 |
| Acrolein | 0.04 |
| HCN | 0.16 |
| $NH_3$ | 0.20 |
| $CO_2$ | 0.13 |

In the second stage of the process this solution is fed continuously to an extractive distillation column 5 of 15 theoretical plates. The operating conditions of that column are as follows:

Pressure _____ 100 mm. Hg.
Water flow _____ 12 kg./kg. of acrylonitrile. This water contains 0.01% of hydroquinone.
Temperature at the top of the column _____ 25° C.
Temperature at bottom of column _____ 52° C.

When the column operates the following cuts are withdrawn:

At the top of the column an organic phase (I) containing:

| | | |
|---|---|---|
| Acrylonitrile | percent | 87 |
| HCN | do | 7.2 |
| $NH_3$ | p.p.m. | <500 |
| Acetonitrile | p.p.m. | <200 |
| Acrolein | p.p.m. | <200 |

Water about 4%.

At the bottom an aqueous phase (II) containing:

| | Percent |
|---|---|
| $NH_3$ | 0.02 |
| $CO_2$ | 0.15 |
| Acrylonitrile | 0.086 |
| Acetonitrile | 0.050 |
| Acrolein | 0.135 |
| HCN | 0.015 |
| Water | Balance |

These two phases were subjected, each in turn, to a separation analogous to that which has been described in Example 1 above. The organic phase yielded, after acid wash and distillation, an acrylonitrile of the following composition:

| | | |
|---|---|---|
| Acrylonitrile | percent approx | 97 |
| HCN | p.p.m. | [1]<100 |
| Acrolein | p.p.m. | [1]<250 |
| Acetonitrile | p.p.m. | [1]<250 |

Water about 3%.

[1] Largely combined in the form of cyanohydrin.

The aqueous phase (II) was introduced into distillation column 16 at the top of which a gaseous product was drawn off containing:

| | Percent |
|---|---|
| $NH_3$ | 3 to 6 |
| Acetonitrile | 0.1 to 0.2 |
| Acrylonitrile | 0.7 to 1.1 |
| Acrolein | 1 to 2 |
| HCN | 0.05 to 0.15 |
| $CO_2$ | 1 to 3 |

At the bottom a liquid consisting essentially of acetonitrile and water was drawn off.

What we claim is:

1. A process for the separation and recovery of the components of a gaseous mixture resulting from the vapor phase catalytic oxidation of propylene in the presence of ammonia to produce acrylonitrile and containing in addition to acrylonitrile, hydrogen cyanide, acetonitrile, acrolein, ammonia and carbon dioxide which comprises washing the gases with water to produce a solution containing acrylonitrile, acetonitrile, acrolein, hydrogen cyanide, ammonia and carbon dioxide, said acrylonitrile being present in an amount up to about 6.5% by weight of said solution, subjecting this solution to extractive distillation with water as an extractant to separate substantially all of the acrylonitrile and the hydrogen cyanide as an overhead distillate and recovering as base product substantially all of the acetonitrile, acrolein and ammonia and a major part of the carbon dioxide which is held in solution owing to the presence of ammonia.

2. A process as set forth in claim 1 wherein the extractive distillation is carried out at a temperature between about 40 and 70° C.

3. A process as set forth in claim 1 including the additional steps of washing the overhead product with acid to remove traces of ammonia therefrom, and thereafter distilling the washed overhead product to remove hydrocyanic acid therefrom and to produce crude acrylonitrile.

4. A process as set forth in claim 1 including the additional step of distilling the base product and withdrawing as overhead from the last mentioned distillation aqueous ammonia containing less than about 0.4% acetonitrile.

References Cited

UNITED STATES PATENTS

| | | | |
|---|---|---|---|
| 2,681,306 | 6/1954 | Kemp et al. | 203—96 |
| 2,744,926 | 5/1956 | Koons | 260—465.3 |
| 3,051,630 | 8/1962 | Hadley et al. | 260—465.9 |
| 3,073,753 | 1/1963 | Hadley et al. | 260—465.9 |
| 3,201,918 | 8/1965 | Sennewald et al. | 260—465.3 |
| 3,210,399 | 10/1965 | Krzemicki | 260—465.3 |
| 3,264,197 | 8/1966 | Schonbeck et al. | 203—85 |

NORMAN YUDKOFF, *Primary Examiner.*

WILBUR L. BASCOMB, Jr., *Examiner.*